Patented Aug. 11, 1942

2,292,741

UNITED STATES PATENT OFFICE 2,292,741

WELD ROD FOR HARD FACING PURPOSES

Arthur T. Cape, Santa Cruz, Calif., and Mathias L. Eder, Canton, Ohio, assignors to Coast Metals, Inc., Canton, Ohio, a corporation of Ohio No Drawing. Application February 11, 1942, Serial No. 430,435

2 Claims. (Cl. 219—8)

This invention relates to weld rods for hard facing purposes.

A primary object of the invention is to provide a weld rod for this purpose which may be used for hard facing various articles which have been subjected to wear and abrasion, but which is especially adapted for hard facing purposes requiring extreme smoothness, such as the facing of piercing mill shoes, small guides in hot finishing mills, guide arrests in various cold operations such as cold straightening where the bar revolves and very often will be marked or scratched by the ordinary type of hard facing, hot trimming dies, exhaust valve seats and inserts, etc.

The weld rod derives its usefulness for the above purposes from the fact that it is formed from a ferrous alloy which not only has high resistance to wear and abrasion, but has high resistance, as well, to heavy and repeated impacts, that is to say, it possesses high mechanical strength. It is also resistant to chemical corrosion and to oxidation at high temperatures, possesses strength at high temperatures, has the quality of being capable of forming a sound bond with the base metal, has a high viscosity, in the molten condition, such as to permit exceedingly easy application thereof to the base metal, and is characterized by the fact that it is non-austenitic in the "as-cast" state and has a hardness ranging from about 43 to about 53 Rockwell C.

The weld rod is preferably made from a ferrous alloy consisting of from 1% to 2% carbon, from 16% to 20% chromium, from 5% to 7% nickel, from 6% to 10% molybdenum, and from 4% to 5% silicon, the balance of the alloy being substantially all iron. The silicon range is somewhat critical, since the silicon content appreciably below this range renders the alloy austenitic. An alloy within this range which has been found particularly useful for hard facing purposes contains about 1% carbon, about 18% chromium, about 6% nickel, about 8% molybdenum and about 4½% silicon.

We claim:

1. A weld rod for hard facing purposes, said rod comprising a ferrous alloy consisting of from 1% to 2% carbon, from 16% to 20% chromium, from 5% to 7% nickel, from 6% to 10% molybdenum, and from 4% to 5% silicon, the balance of the alloy being substantially all iron, said alloy having high resistance to wear and abrasion, as well as to heavy and repeated impacts, resistance to chemical corrosion and to oxidation at high temperatures, and possessing also strength at high temperatures, said alloy capable of forming a sound bond with a base metal and having a viscosity, in the molten condition, such as to permit exceedingly easy application thereof to a base metal, the alloy being further characterized by the fact that it is non-austenitic in the "as-cast" state and has a hardness ranging from 43 to 53 Rockwell C.

2. A weld rod for hard facing purposes, said rod comprising a ferrous alloy consisting of about 1% carbon, about 18% chromium, about 6% nickel, about 8% molybdenum, and about 4½% silicon, the balance being substantially all iron, said alloy having high resistance to wear and abrasion, as well as to heavy and repeated impacts, resistance to chemical corrosion and to oxidation at high temperatures, and possessing also strength at high temperatures, said alloy capable of forming a sound bond with a base metal and having a viscosity, in the molten condition, such as to permit exceedingly easy application thereof to a base metal, the alloy being further characterized by the fact that it is non-austenitic in the "as-cast" state.

ARTHUR T. CAPE.
MATHIAS L. EDER.